(12) United States Patent
Uchihara (10) Patent No.: US 9,843,703 B2
(45) Date of Patent: Dec. 12, 2017

(54) IMAGE PROCESSING APPARATUS AND METHOD OF CONTROLLING THE SAME

(71) Applicant: CANON KABUSHIKI KAISHA, Tokyo (JP)

(72) Inventor: Masato Uchihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 31 days.

(21) Appl. No.: 14/464,856

(22) Filed: Aug. 21, 2014

(65) Prior Publication Data

US 2015/0055863 A1 Feb. 26, 2015

(30) Foreign Application Priority Data

Aug. 26, 2013 (JP) ................................. 2013-174967

(51) Int. Cl.
*H04N 1/60* (2006.01)
*H04N 1/409* (2006.01)
*H04N 9/04* (2006.01)

(52) U.S. Cl.
CPC ............. *H04N 1/60* (2013.01); *H04N 1/4092* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 2008/0212892 A1* | 9/2008 | Doida et al. | 382/274 |
| 2009/0021578 A1* | 1/2009 | Yamazaki et al. | 348/65 |
| 2012/0294527 A1* | 11/2012 | Lukac | G06K 9/40 382/167 |
| 2013/0027591 A1* | 1/2013 | Lukac | H01L 27/14623 348/242 |
| 2013/0076938 A1* | 3/2013 | Kano | H04N 1/409 348/224.1 |

(Continued)

FOREIGN PATENT DOCUMENTS

| | | |
|---|---|---|
| CN | 102844788 A | 12/2012 |
| CN | 102968761 A | 3/2013 |

(Continued)

OTHER PUBLICATIONS

The above patent documents in this IDS were cited in a Apr. 8, 2016 Chinese Office Action, which is enclosed with an English Translation, that issued in Chinese Patent Application No. 201410424206.7.

(Continued)

*Primary Examiner* — Sumati Lefkowitz
*Assistant Examiner* — Jiangeng Sun
(74) *Attorney, Agent, or Firm* — Cowan, Liebowitz & Latman, P.C.

(57) ABSTRACT

An image processing apparatus that can suppress a tint phenomenon in image recovery processing and a method of controlling the same are disclosed. A saturation determination unit determines whether or not a saturated pixel is included in a reference region referred to by filter processing units. An R component output adjustment unit and a B component output adjustment unit adjust corresponding color components resulting from image recovery processing according to the determination result obtained by the saturation determination unit.

8 Claims, 9 Drawing Sheets

(56) References Cited

U.S. PATENT DOCUMENTS

| | | | |
|---|---|---|---|
| 2013/0322745 A1* | 12/2013 | Lim | H04N 9/73 |
| | | | 382/162 |
| 2015/0022687 A1* | 1/2015 | Galor | H04N 5/23229 |
| | | | 348/229.1 |
| 2015/0256760 A1* | 9/2015 | Ju | H04N 9/045 |
| | | | 348/256 |

FOREIGN PATENT DOCUMENTS

| | | |
|---|---|---|
| CN | 102984527 A | 3/2013 |
| CN | 103198453 A | 7/2013 |
| JP | 4599398 B2 | 12/2010 |
| JP | 2013-051599 A | 3/2013 |
| JP | 2013-084247 A | 5/2013 |
| WO | 2006/101128 A1 | 9/2006 |
| WO | 2011/121760 A1 | 10/2011 |

OTHER PUBLICATIONS

The above patent documents in this IDS were cited in a Jan. 5, 2016 Japanese Office Action, which is enclosed without an English Translation, that issued in Japanese Patent Application No. 2013174967.

* cited by examiner

FIG. 5A
BEFORE RECOVERY PROCESSING

FIG. 5B
AFTER RECOVERY PROCESSING

FIG. 5C
AFTER TINTING COUNTERMEASURE

FIG. 6A BEFORE RECOVERY PROCESSING

FIG. 6B AFTER RECOVERY PROCESSING

FIG. 6C AFTER TINTING COUNTERMEASURE (1ST EMBODIMENT)

FIG. 6D AFTER TINTING COUNTERMEASURE (2ND EMBODIMENT)

IMAGE PROCESSING APPARATUS AND METHOD OF CONTROLLING THE SAME

BACKGROUND OF THE INVENTION

Field of the Invention

The present invention relates to an image processing apparatus and a method of controlling the same, and in particular relates to an image correction technique.

Description of the Related Art

In order to correct image degradation that occurred due to an aberration or diffraction phenomenon in an imaging optical system, processing (image recovery processing) is known in which degradation in an image is corrected using information regarding the optical transfer function (OTF) of the imaging optical system (refer to paragraphs 0008 to 0013 of Japanese Patent Laid-Open No. 2013-51599). Also, letting g(x,y) be the degraded image and f(x,y) be the original image, R(x,y) in the following equation is called an image recovery filter.

$$g(x,y)*R(x,y)=f(x,y)$$

Note that the operator "*" in the above equation represents convolution (a product-sum operation), and (x,y) represents coordinates in the image.

Letting the optical transfer function of the imaging optical system be H(u,v), the image recovery filter is obtained by calculating the inverse Fourier transform of 1/H. Note that (u,v) represents coordinates in a two-dimensional frequency surface, that is to say, represents a frequency. The image recovery filter that is applied to a two-dimensional image is generally a two-dimensional filter that has a tap (cell) corresponding to each pixel in the image.

The extent of image degradation occurring due to aberration or light diffraction in the imaging optical system varies since the influence of aberration and diffraction differs depending on the wavelength of incident light, that is to say differs for each color component, and therefore recovery filters having different characteristics are applied for each color component. Generally, with an image acquired by an imaging element having a pixel size of approximately several μm, the influence of aberration and diffraction extends to several tens of pixels, and therefore the recovery filter needs to be a filter that has many taps in order to be able to refer to a wide range of pixels.

With filter processing that refers to a wide range of pixels, image quality is readily negatively influenced due to the inability to obtain a correct signal value in and around a saturated portion of the input image. With image recovery processing that applies filters having different characteristics for each color component, tinting readily occurs due to a loss of balance between the color components.

As one example of a method of suppressing such effects, Japanese Patent No. 4599398 discloses a technique for suppressing the effect of filter processing according to the brightness of the image area being referred to by the filter.

However, the conventional techniques disclosed in Japanese Patent Laid-Open No. 2013-51599 and Japanese Patent No. 4599398 do not give consideration to maintaining balance in output values among filters. For this reason, it has not been possible to address a problem such as tinting, which occurs in processing that applies separate filters for each component of an image signal as in image recovery processing.

SUMMARY OF THE INVENTION

An object of the present invention is to provide an image processing apparatus that can suppress a tint phenomenon in image recovery processing and a method of controlling the same.

According to an aspect of the present invention, there is provided an image processing apparatus comprising: a filter unit configured to performing image recovery processing by applying a spatial filter for each of color components of an image; a determination unit configured to determining whether or not a saturated pixel is included in a reference region that is a region of pixels referred to by the spatial filter; and an adjustment unit configured to adjusting a color component among the color components resulting from the image recovery processing according to a determination result obtained by the determination unit.

According to another aspect of the present invention, there is provided an image processing apparatus comprising: a filter unit configured to performing image recovery processing by applying a spatial filter for each of color components of an image; a determination unit configured to determining whether or not a pixel whose value is greater than or equal to a predetermined threshold value is included in a reference region that is a region of pixels referred to by the spatial filters; and an adjustment unit configured to adjusting a color component among the color components resulting from the image recovery processing according to a determination result obtained by the determination unit.

According to a further aspect of the present invention, there is provided a method of controlling an image processing apparatus, comprising: a filter step of performing image recovery processing by applying a spatial filter for each of color components of an image; a determination step of determining whether or not a saturated pixel is included in a reference region that is a region of pixels referred to by the spatial filters; and an adjustment step of adjusting a color component among the color components resulting from the image recovery processing according to a determination result obtained in the determination step.

According to yet further aspect of the present invention, there is provided a method of controlling an image processing apparatus, comprising: a filter step of performing image recovery processing by applying a spatial filter for each of color components of an image; a determination step of determining whether or not a pixel whose value is greater than or equal to a predetermined threshold value is included in a reference region that is a region of pixels referred to by the spatial filters; and an adjustment step of adjusting a color component among the color components resulting from the image recovery processing according to a determination result obtained in the determination step.

Further features of the present invention will become apparent from the following description of exemplary embodiments with reference to the attached drawings.

DESCRIPTION OF THE EMBODIMENTS

Figure 7:
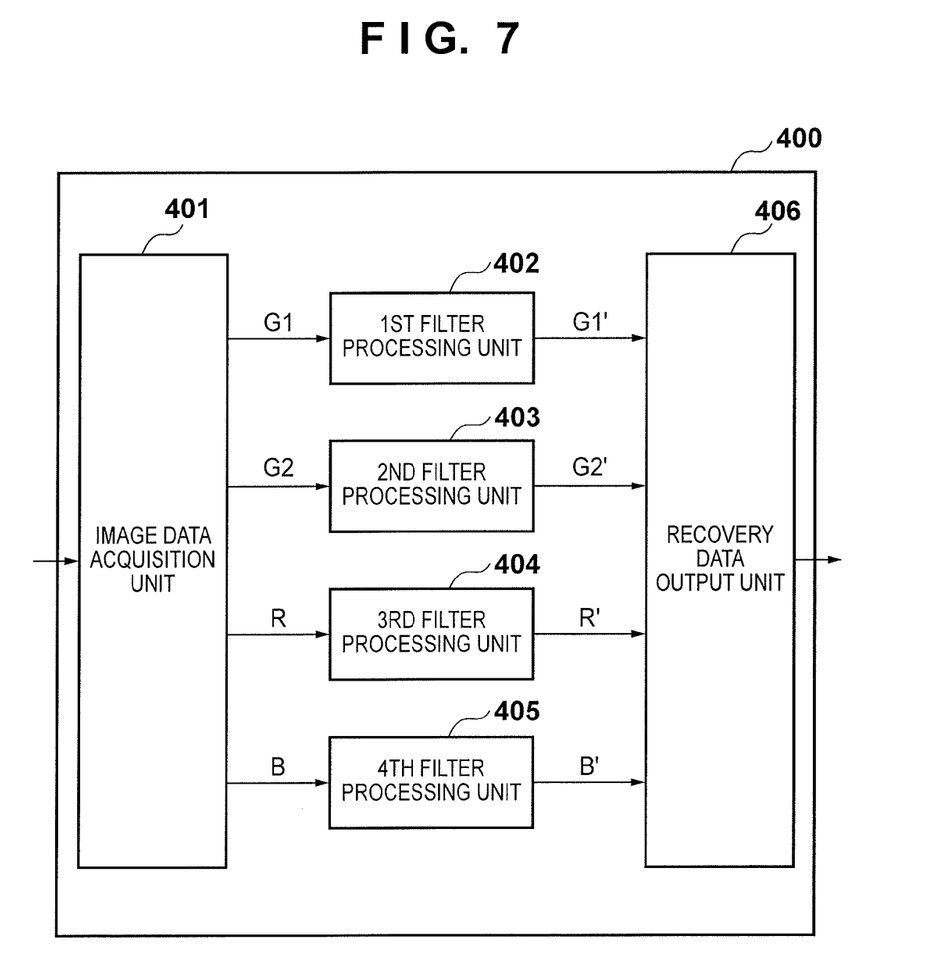
FIG. 7 is a block diagram showing an example of a basic functional configuration of an image processing apparatus that performs image recovery processing.

Exemplary embodiments of the present invention will now be described in detail in accordance with the accompanying drawings. First, basic image recovery processing and problems that occur therein will be described. FIG. 7 is a block diagram showing an example of the basic functional configuration of an image processing apparatus 400 that performs image recovery processing.

Figure 8A:
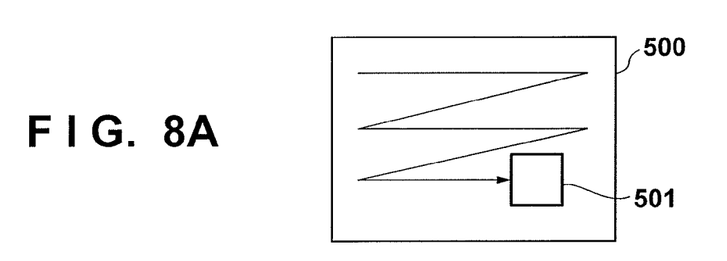
FIGS. 8A to 8D are diagrams for describing an overview of filter processing in image recovery processing.

An image data acquisition unit 401 reads out, from image data targeted for processing, image data that corresponds to a partial region as shown by 501 in FIG. 8A. This partial region is a region made up of pixels that are to be referred to in one instance of image recovery processing performed by later-stage first to fourth filter processing units 402 to 405, and therefore will be called a "reference region" hereinafter.

Figure 8B:
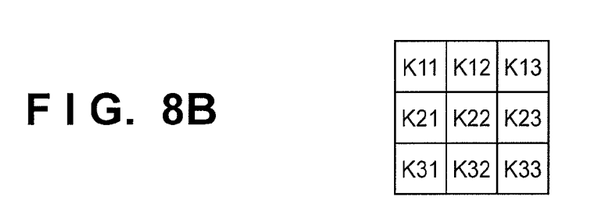
Figure 8C:
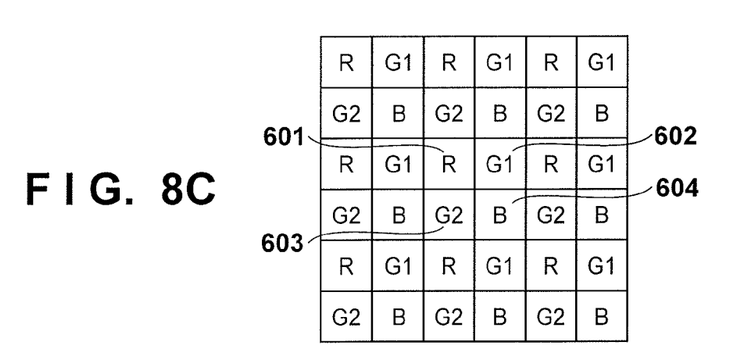
Figure 8D:
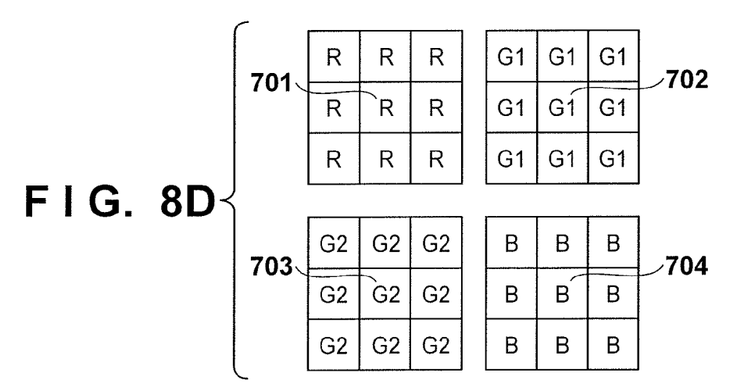

Here, it is assumed that, for example, the first to fourth filter processing units 402 to 405 are each a 3×3 two-dimensional spatial filter as shown in FIG. 8B (i.e., a filter that refers to 3×3×4 image data in one instance of image recovery processing). In this case, the reference region 501 is 6×6 pixels in size as shown in FIG. 8C. After reading out the image data corresponding to the reference region 501, the image data acquisition unit 401 separates it into color components G1, G2, R, and B as shown in FIG. 8D, and outputs the color components to the corresponding first to fourth filter processing units 402 to 405. Here, pixels 701 to 704 that are located at the center of the image data separated into the respective colors (and that correspond to pre-separation pixels 601 to 604 in FIG. 8C) are the pixels that are targeted for image recovery processing, and will be called "pixels of interest". In other words, four pixels making up one unit of the Bayer arrangement are processed in one instance of image recovery processing.

The four first to fourth filter processing units 402 to 405 provided one for each color component are recovery filters that perform image recovery processing on input image data of one color component. Since the influence of aberration and light diffraction differs depending on shooting conditions such as the aperture and focal length of the imaging optical system, the values of the 3×3 filter coefficients of the first to fourth filter processing units 402 to 405 are set according to the shooting conditions. The spatial filter processing is performed by performing a product-sum operation on the color component values at the 3×3 pixel positions and the corresponding filter coefficients. For example, in the recovery filter processing performed on the pixel 701 in FIG. 8D, the product of the color component value of the pixel 701 and a filter coefficient K22 is obtained, and in this way, the products of filter coefficients K11 to K33 and the values at their corresponding positions are obtained, and the sum of the products is the processing result. Note that although the example of a 3×3 two-dimensional spatial filter is described here in order to simplify the description, it is actually desirable to use a two-dimensional spatial filter that has a combination of 30×30 coefficients or more.

Returning to FIG. 7, image data R', G1', G2', and B' that is the result of the image recovery processing and output by the first to fourth filter processing units 402 to 405 is then reverted to the Bayer arrangement shown in FIG. 8C and output by a recovery data output unit 406.

The reading out of image data in a reference region, the execution of image recovery processing, and the output of processing results are repeated such that all of the pixels in the image are subjected to the above-described processing as pixels of interest.

Figure 9A:
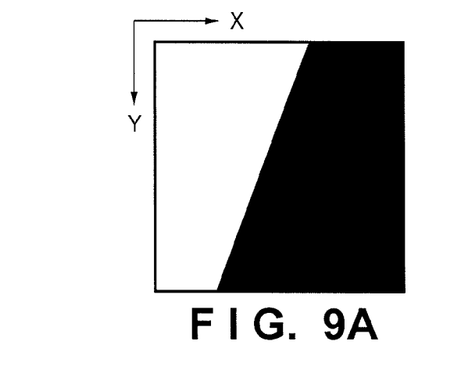
FIGS. 9A to 9D are diagrams for describing a tint phenomenon that occurs in image recovery processing.
Figure 9B:
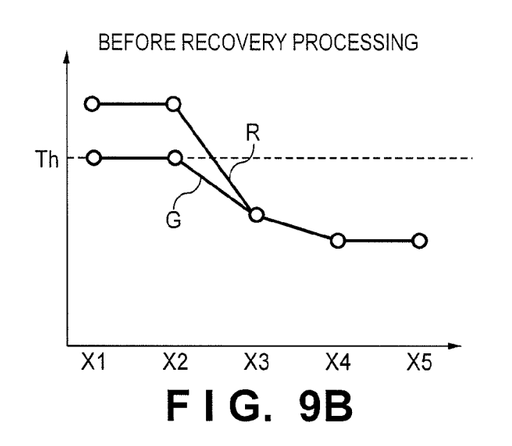

The following describes a tint phenomenon that occurs in image recovery processing. FIG. 9A shows an example of an image that includes an achromatic color edge, and FIG. 9B is a diagram in which the pixel values of a pixel line corresponding to the edge portion of the image in FIG. 9A are plotted in the X direction separately for each color component. In FIG. 9B, the horizontal axis indicates the pixel position in the X direction, the vertical axis indicates the color component value, and Th is a value indicating the saturated level for the color component values in the imaging element that generated the image data targeted for processing.

FIG. 9B shows G component pixel values and R component pixel values prior to image recovery processing. These values are values after the execution of white balance processing (gain adjustment giving consideration to the spectral sensitivity of the imaging element and the color temperature of the light source) on the color component values read out from the imaging element. Note that here, before white balance processing, the G component is saturated but the R component is not saturated, and it is assumed that due to white balance processing, the G component value does not change, whereas the R component value is amplified. In the case of the G component, the values at pixel positions X1 and X2 are saturated before white balance processing, and it is shown that the original values are lost after white balance processing as well. On the other hand, in the case of the R component, the values are below the saturated level before white balance processing, and therefore they are amplified by an amount corresponding to the amount of gain adjustment in white balance processing. As a result, in the case of the R component, the values at the pixel positions X1 and X2 are values higher than the saturated component. Note that it is assumed that the B component pixel values (not shown) are similar to the R component pixel values.

Figure 9C:
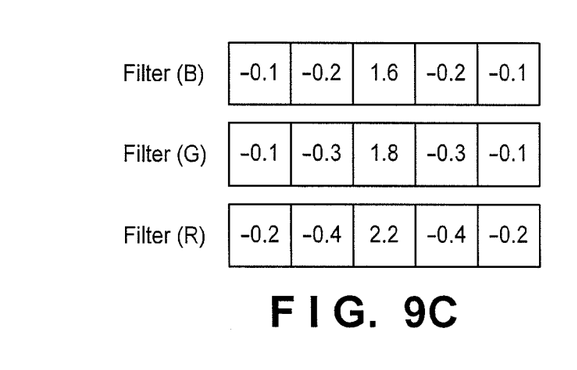

It is assumed that the pixels in FIG. 9B are subjected to image recovery processing by applying edge enhancement filters having different characteristics for each color signal as shown in FIG. 9C in order to make an improvement in terms of the reduction in contrast due to diffraction. Note that one-dimensional filters are applied in the X direction in this description in order to simplify the description and facilitate understanding.

Figure 9D:
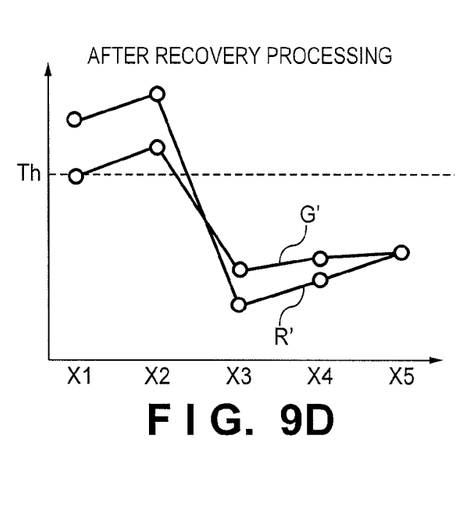

FIG. 9D shows component values resulting from the image recovery processing. In the case of the R component (and the B component), filter processing can be carried out on all of the pixels using only the unsaturated component values, and therefore the original effects of edge enhancement can be obtained. On the other hand, in the case of the G component, the saturated pixel X2 (or the saturated pixels X2 and X1) is referred to in the filter processing in which pixel position X3 is the pixel of interest, and therefore the value resulting from the filter processing is not the correct value. In this example, the G component is greater than the R component (and the B component) at the pixel position X3 after the image recovery processing, and as a result, green tinting is observed in the vicinity of the pixel position X3.

On the other hand, the R component (and the B component) is greater than the G component at the pixel positions X1 and X2, but the values exceeding the saturated level (Th) will be reduced to the saturated level through clip processing in later-stage development processing. These color components are therefore reduced to the saturated level and displayed as achromatic colors (blown-out highlights).

In this way, correct filter results are not obtained if saturated pixels are referred to in image recovery processing that employs filter processing, and tinting occurs in the region in and around a saturated portion. In particular, in the achromatic color edge region given as an example here, the G component for which the imaging element has a high spectral sensitivity is more likely to be saturated than the R and B components, and therefore there is a tendency for the recovery amount for the G component to be lower than the R and B components, and for green tinting to more readily occur as a result.

First Embodiment

The following describes an illustrative embodiment of the present invention.

Figure 1:
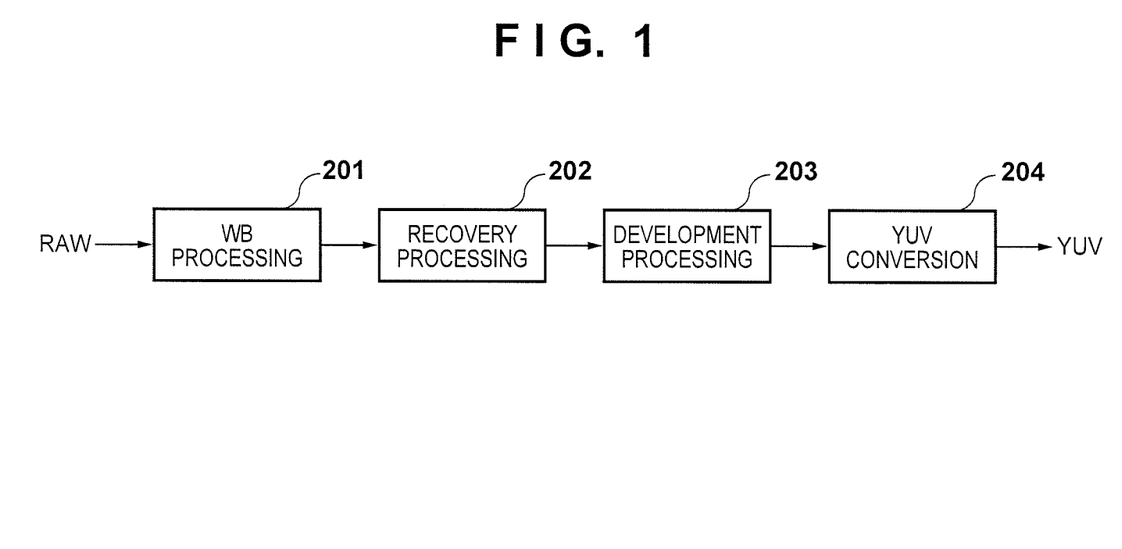
FIG. 1 is a diagram schematically showing the overall flow of image processing according to an embodiment.

FIG. 1 schematically shows the overall flow of image processing that includes image recovery processing. Image processing performed on RAW data will be described here. It is assumed in the present embodiment as well that the RAW data has the Bayer arrangement shown in FIG. 8C.

First, gain adjustment processing (white balance (WB) processing) 201 is applied to input image data (RAW data) separately for each color component giving consideration to the color temperature of the light source and the spectral sensitivity of the sensor.

Next, image recovery processing 202 is applied to the image data resulting from the gain adjustment. Details of the image recovery processing will be described later. Similarly to the input image data, the output after the image recovery processing has the Bayer arrangement.

Next, development processing 203 such as color interpolation (demosaic) processing, noise reduction and sharpness processing, and gamma processing is applied to the image data resulting from the image recovery processing. YUV conversion processing 204 for conversion from the RGB format into the YUV format is then applied to the image data resulting from the development processing, and thus this series of image processing is completed.

Note that in the present embodiment, it is envisioned that image data is passed between the function blocks and steps via a memory. Note that if the processing of the function blocks and steps is executed using dedicated hardware modules, the data may be passed directly between the hardware modules. This is of course based on the presumption that the hardware modules have a sufficient buffer memory capacity for holding the data.

Figure 2:
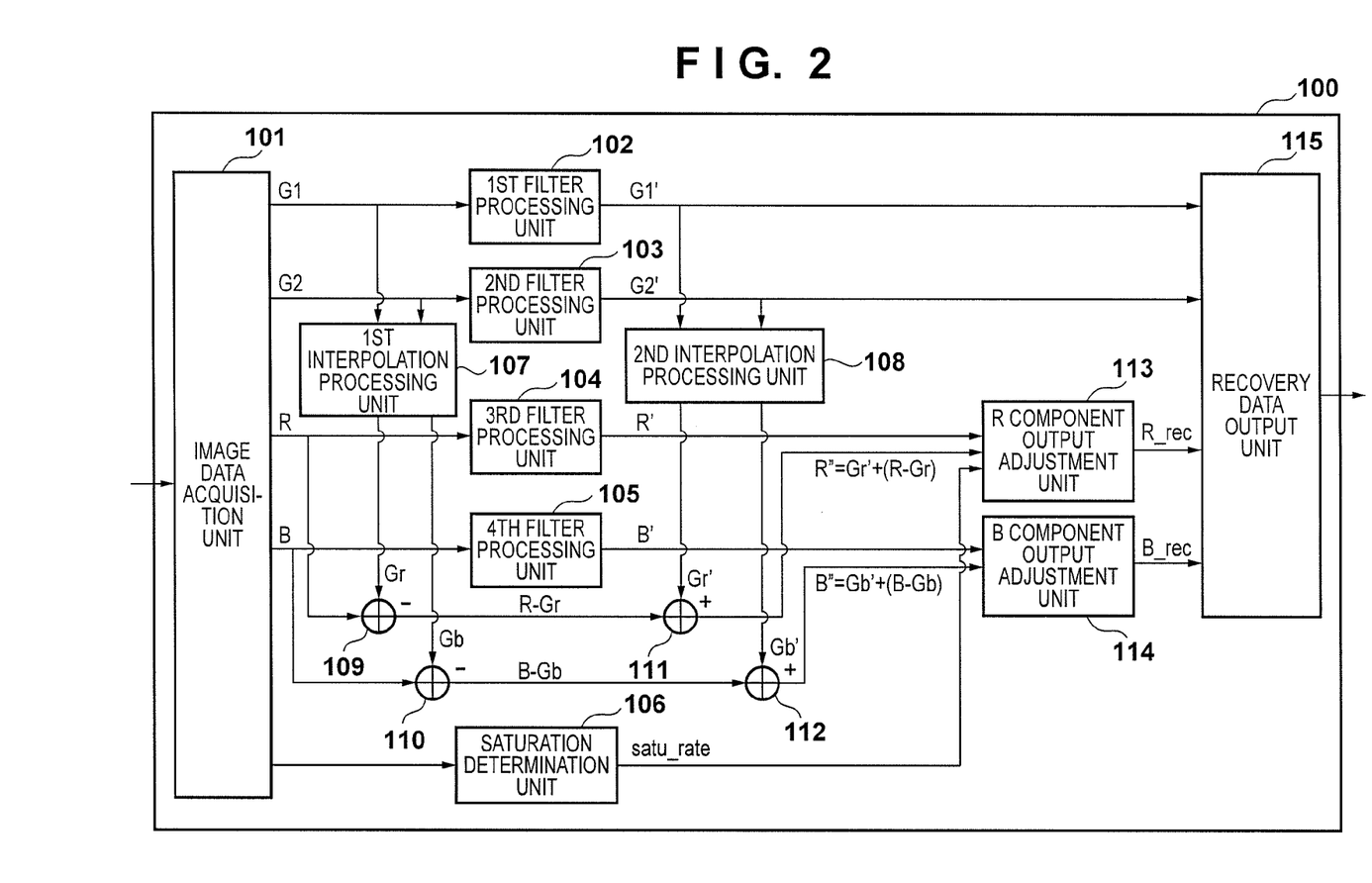
FIG. 2 is a block diagram showing an example of a functional configuration of an image processing apparatus according to an embodiment.

FIG. 2 is a block diagram showing an example of the functional configuration of an image processing apparatus 100 according to this embodiment of the present invention for executing the image recovery processing 202 shown in FIG. 1.

Similarly to the image data acquisition unit 401 in FIG. 7, an image data acquisition unit 101 reads out image data corresponding to a reference region whose size corresponds to the size of the spatial filters used by first to fourth filter processing units 102 to 105. The image data acquisition unit 101 then outputs the image data corresponding to the reference region as it is to a saturation determination unit 106, and also separates it into color components and outputs them to the first to fourth filter processing units 102 to 105.

The saturation determination unit 106 refers to the image data corresponding to the reference region, determines whether or not it includes even one pixel whose value is greater than or equal to a pre-set threshold value (saturated level), and outputs the result of the determination to an R component output adjustment unit 113 and a B component output adjustment unit 114. If the reference region includes a saturated pixel, it is determined that a recovery filter will refer to a saturated pixel in image recovery processing applied to the pixel of interest.

As described with reference to FIG. 7, the first to fourth filter processing units 102 to 105 perform image recovery processing for the respective color components and respectively output color component values R', G1', G2', and B' resulting from image recovery processing.

In accordance with the result of the determination made by the saturation determination unit 106, the R component output adjustment unit 113 outputs either the output value R' from the third filter processing unit 104 or a later-described tint correction value (color difference adjustment value R") to a recovery data output unit 115. Similarly, in accordance with the result of the determination made by the saturation determination unit 106, the B component output adjustment unit 114 outputs either the output value B' from the fourth filter processing unit 105 or a later-described tint correction value (color difference adjustment value B") to the recovery data output unit 115.

Similarly to the recovery data output unit 406 in FIG. 7, the recovery data output unit 115 then reverts the image data resulting from the image recovery processing, which is input separately for each color component, to the Bayer arrangement and outputs it.

Figure 3:
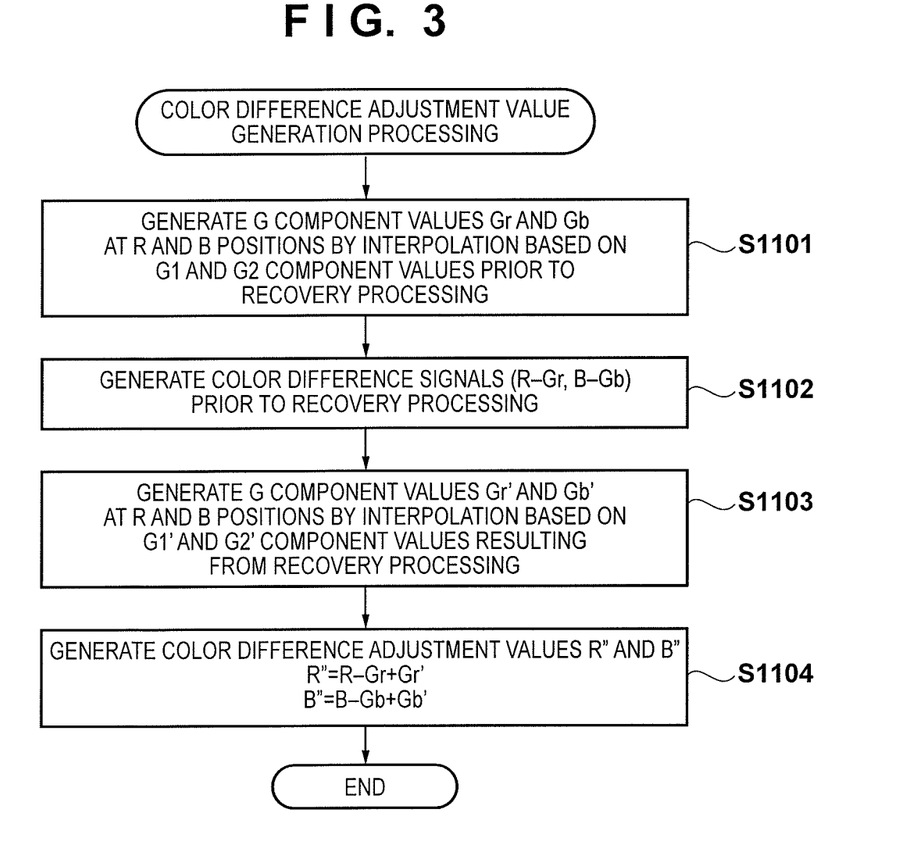
FIG. 3 is a flowchart for describing a color difference adjustment value generation method used in an embodiment.

Next, the method of generating the color difference adjustment values R" and B" will be described with reference to the flowchart in FIG. 3.

Figure 4A:
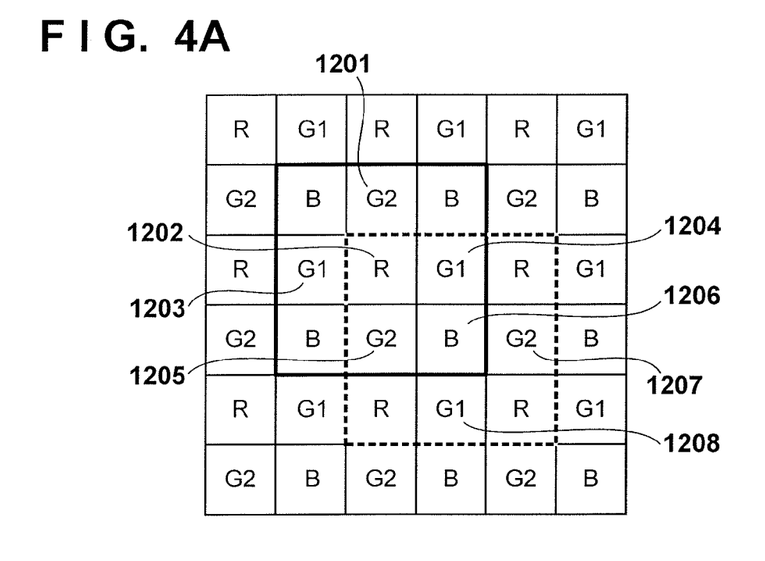
FIGS. 4A to 4C are diagrams for describing interpolation processing according to an embodiment.
Figure 4B:
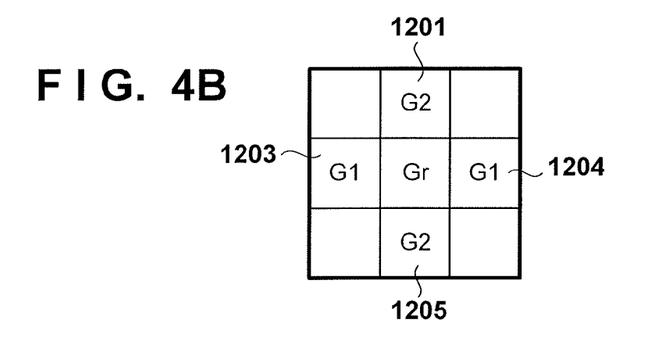
Figure 4C:
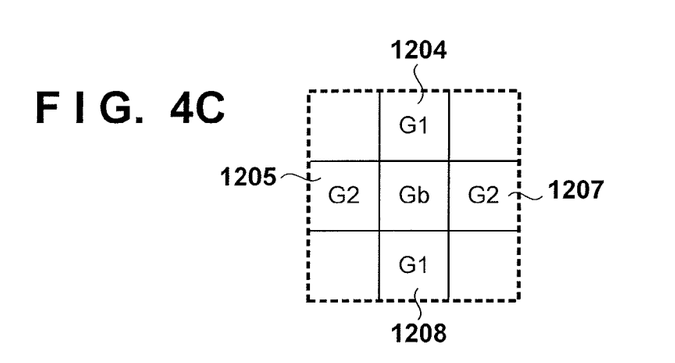

First, in step S1101, a first interpolation processing unit 107 generates G component values Gr and Gb at the R and B positions in the Bayer arrangement by performing interpolation based on the G1 and G2 component values prior to image recovery processing. For example, Gr is the value at the central pixel position in the region (FIG. 4B) obtained by clipping out the G1 and G2 pixels above, below, leftward, and rightward of an R pixel 1202, which is the pixel of interest shown in FIG. 4A, and Gr can be calculated as the average value of the G1 and G2 pixels 1201, 1203, 1204, and 1205. Also, Gb is the value at the central pixel position in the region (FIG. 4C) obtained by clipping out the G1 and G2 pixels above, below, leftward, and rightward of a B pixel 1206, which is the pixel of interest shown in FIG. 4A, and Gb can be calculated as the average value of the G1 and G2 pixels 1204, 1205, 1207, and 1208. Note that these calculation methods are merely examples, and it is possible to use methods in which different numbers of pixels at different positions are used in interpolation.

In step S1102, computing units 109 and 110 in FIG. 2 respectively calculate difference values R−Gr and B−Gb by subtracting the values of Gr and Gb calculated by the first interpolation processing unit 107 from the values of the R and B components at corresponding positions prior to image recovery processing, and output the difference values to computing units 111 and 112 respectively.

In step S1103, similarly to the first interpolation processing unit 107, a second interpolation processing unit 108 calculates G components Gr' and Gb' at the R and B positions in the Bayer arrangement using the values of the G1' and G2' components resulting from the image recovery processing, and outputs the G components Gr' and Gb' to the computing units 111 and 112.

In step S1104, the computing units 111 and 112 respectively add the difference values R−Gr and B−Gb calculated by the computing units 109 and 110 to the G component values Gr' and Gb' calculated by the second interpolation processing unit 108 for the corresponding R and B positions. In this way, the computing units 111 and 112 generate color difference adjustment values R" and B". In other words, the color difference adjustment values R" and B" are generated according to Equations 1 and 2 below.

$$R''=R-Gr+Gr' \quad (1)$$

$$B''=B-Gb+Gb' \quad (2)$$

In this way, the color difference adjustment values R" and B" are values obtained by adding the differences (amounts of change) Gr'−Gr and Gb'−Gb, which are the differences between the G components at the same pixel position before and after image recovery processing, to the color component values R and B prior to image recovery processing.

The follow equations are obtained based on Equations 1 and 2.

$$R''-Gr'=R-Gr \quad (3)$$

$$B''-Gb'=B-Gb \quad (4)$$

It can be understood that if the color difference adjustment values R" and B" are used as the R and B values resulting from image recovery processing, color differences equivalent to the color difference R−G and the color difference B−G in the pixel values prior to image recovery processing are maintained in the pixel values resulting from image recovery processing.

As described above, the image processing apparatus 100 of the present embodiment obtains the color difference adjustment values R" and B" for the R and B pixels respectively, and supplies them to the R component output adjustment unit 113 and the B component output adjustment unit 114 respectively. Also, if the saturation determination unit 106 determines that a saturated pixel is included in the reference region, the R component output adjustment unit 113 outputs the color difference adjustment value R" instead of R' output by the third filter processing unit 104, as an R component R_rec resulting from image recovery processing. Also, the B component output adjustment unit 114 outputs the color difference adjustment value B" instead of B' output by the fourth filter processing unit 105, as a B component B_rec resulting from image recovery processing. For this reason, even if a saturated pixel is referred to when filter processing is performed, it is possible to maintain the color difference between the pixel values before and after image recovery processing, and to suppress tinting.

Note that a configuration is possible in which, in the case where the pixel of interest (color component value) is saturated (exceeds the saturated level), the value resulting from image recovery processing is not replaced even if the recovery filter refers to the saturated pixel. For example, the value R' resulting from image recovery processing may be used as is for the pixel positions X1 and X2. In this case, if the pixel of interest is a saturated pixel, it is sufficient that the saturation determination unit 106 does not make the determination that a saturated pixel is included (that the filter will refer to a saturated pixel), regardless of whether or not another saturated pixel is included in the reference region.

Next, effects of the image processing apparatus 100 of the present embodiment will be described with reference to FIGS. 5A to 5C.

Figure 5A:
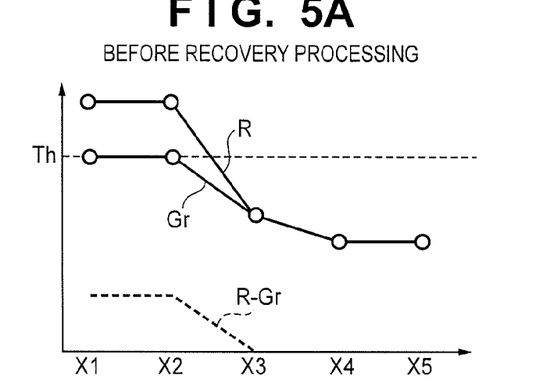
FIGS. 5A to 5C are diagrams for describing effects obtained by a first embodiment.

FIG. 5A is a diagram in which the pixel values of a pixel line corresponding to an edge portion in and around a saturated portion are plotted in the X direction separately for each color component, similarly to FIG. 9B. Note that values for the R component and the values for the G component (Gr) at corresponding pixel positions, which are obtained by interpolation, are shown in FIG. 5A. As was described with FIG. 9B, all of the values are values after white balance processing, and FIG. 5A shows a state in which the G component values at the pixel positions X1 and X2 have been lost due to saturation. Note that in this example, it is assumed that if a value that has been lost due to saturation is included among the G component values, the G component value after white balance processing will be the same as the R component value. Also, the broken line (R−Gr) indicates the difference value between the R component and the G component (Gr) (color difference R−Gr).

Figure 5B:
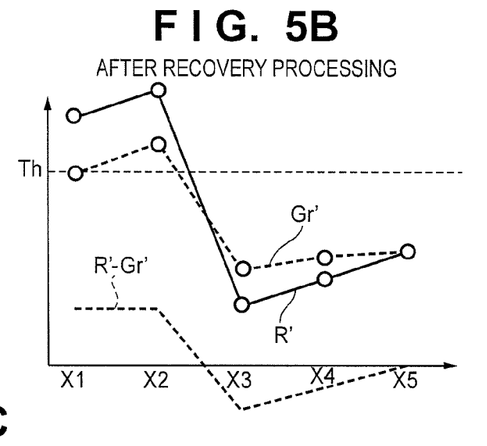

FIG. 5B shows the result of performing image recovery processing on the R component and the Gr component having these values with use of the recovery filters shown in FIG. 9C that have different characteristics for each color component. Similarly to FIG. 9D, in the image recovery processing performed on the G component, the original value cannot be referred to due to the influence of saturation. For this reason, the G component Gr' at the pixel positions X3 and X4, which are obtained by interpolation based on the G components G1' and G2' resulting from image recovery processing, are higher than the R component R' resulting from image recovery processing, which is not influenced by saturation, and this causes green tinting. Note that both of the components exceed the saturated level at the pixel positions X1 and X2, and both of them will be reduced to the saturated level through clip processing in later-stage development processing, and therefore the difference in value will not cause tinting.

Figure 5C:
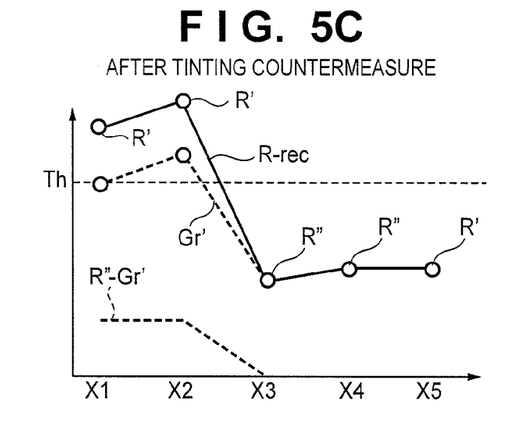

FIG. 5C, on the other hand, shows the results of image recovery processing in which the recovery filters refer to the saturated pixels X1 and X2, and in this case, the R component R' resulting from image recovery processing has been replaced with the color difference adjustment value R" obtained by adding the color difference R—Gr prior to image recovery processing to the G component Gr' resulting from image recovery processing. Note that as previously described, a configuration is possible in which, among the pixel positions X1 to X4 at which the recovery filter refers to the saturated pixels X1 and X2, replacement is not performed with respect to the pixel positions X1 and X2 at which the pixel of interest is saturated, and instead the value R' resulting from image recovery processing is used as is.

Both the difference between the values at the positions X2 and X3, and the difference between the values at the positions X3 and X4 become smaller by replacing R' with R" at the positions X3 and X4 and thus the effect of edge enhancement decreases. However, the color differences R"−Gr' at these pixel positions are equal to the color differences R−Gr prior to image recovery processing, and therefore the difference between the G component and the R component that arises due to the image recovery processing is suppressed, and thus tinting is suppressed.

Although the description has been given using the R component as a representative example, in the case of the B component as well, it is sufficient that, similarly, the B component value at the position of a pixel of interest for which the recovery filter refers to a saturated pixel is replaced with the color difference adjustment value B" obtained by adding the color difference B–Gb prior to image recovery processing to the G component Gb' resulting from image recovery processing. Accordingly, the color difference B–Gb prior to image recovery processing is maintained after image recovery processing.

In this way, in the present embodiment, in and around a saturated portion, or more specifically, in the case where a saturated pixel is referred to in recovery filter processing, a color component value for maintaining the color difference before and after image recovery processing (color difference adjustment value) at the pixel of interest is used as the color component value resulting from image recovery processing. This enables suppressing tinting that occurs in and around a saturated portion due to a loss of balance between color components before and after image recovery processing that employs spatial filters.

Second Embodiment

In the first embodiment, tinting in and around a saturated portion is suppressed by switching the signal value resulting from image recovery processing depending on whether or not the reference region referred to by the recovery filters includes a saturated pixel.

However, in a method in which the output signal is simply switched, there is the risk of a pseudo contour appearing in the vicinity of the boundary where the switch occurs. For this reason, a feature of the configuration of the present embodiment is that the appearance of a pseudo contour is suppressed by performing weighted addition on the signal value resulting from image recovery processing according to the percentage of saturated pixels in the reference region referred to by the recovery filters.

Since the present embodiment can also be realized by an image processing apparatus having the functional configuration that was described in the first embodiment with reference to FIG. 2, the following describes processing that is different from the first embodiment.

Figure 6A:
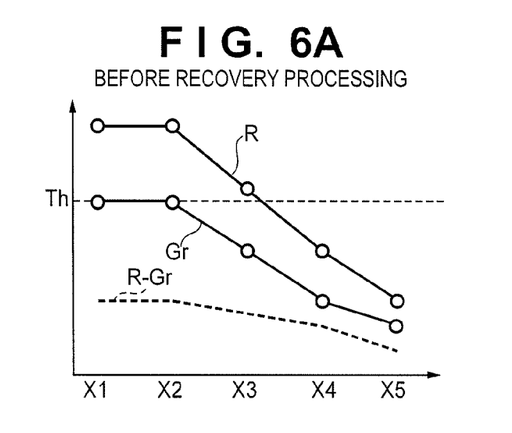
FIGS. 6A to 6D are diagrams for describing effects obtained by a second embodiment.

FIG. 6A is a diagram in which the R component values of a pixel line corresponding to an edge portion in and around a saturated portion, and also the G component (Gr) values at corresponding pixel positions that were obtained by interpolation are plotted in the X direction, similarly to FIG. 5A. All of the values are values after white balance processing, and FIG. 6A shows a state in which the G component values at the pixel positions X1 and X2 have been lost due to saturation. Also, the broken line (R–Gr) indicates the difference value between the R component and the G component (Gr) (color difference R–Gr). In the edge portion shown in FIG. 6A, the R component is higher than the G component due to the influence of diffraction, and therefore tinting has occurred.

Figure 6B:
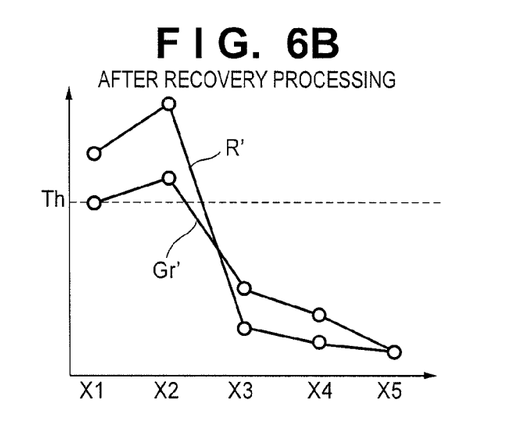

FIG. 6B shows the result of performing image recovery processing on the R component and the Gr component having these values with use of the recovery filters shown in FIG. 9C that have different characteristics for each color component. Similarly to FIG. 5B, the G component Gr' at the pixel positions X3 and X4 has a higher value than the R component R' resulting from image recovery processing, which is not influenced by saturation, and this causes green tinting.

Figure 6C:
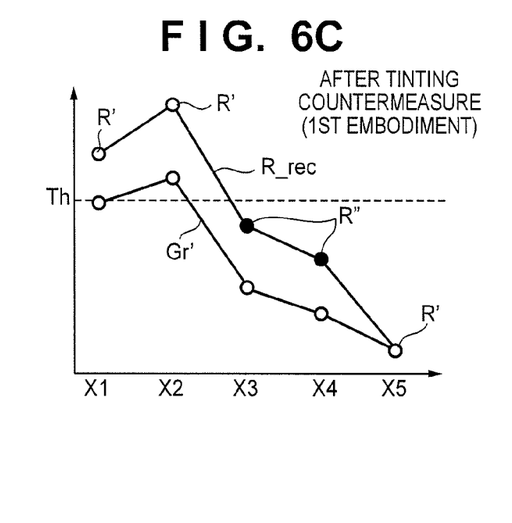

FIG. 6C shows results in which, according to the method of the first embodiment, among the pixel positions X1 to X4 at which the recovery filters refer to a saturated pixel, the R component value R' at the pixel positions X3 and X4 at which the pixel of interest is not saturated has been replaced with the color difference adjustment value R". Tinting is suppressed at these pixel positions since the color difference before and after image recovery processing is maintained (R–Gr=R"–Gr'), but the recovery effect with respect to the R component decreases. Also, a step appears between the R component value at the pixel position X4 at which the output value is switched and the R component value at the pixel position X5 at which the output value is not switched, and therefore there is the risk of a pseudo contour appearing in the image obtained after development processing.

In the present embodiment, in order to suppress the appearance of such a pseudo contour, the saturation determination unit 106 obtains the percentage of saturated pixels with respect to the total number of pixels in the reference region (i.e., obtains a saturation rate) rather than determining whether or not the reference region includes a saturated pixel. Also, the R component output adjustment unit 113 outputs the result of performing weighted addition on the R component value R' resulting from image recovery processing such that the weight of the color difference adjustment value R" rises as the saturation rate rises. The B component output adjustment unit 114 performs similar processing for the B component. The weighted addition performed by the R component output adjustment unit 113 and the B component output adjustment unit 114 is expressed by Equations 5 and 6 below.

$$R\_rec=(1-\alpha)\times R'+\alpha\times R'' \quad (5)$$

$$B\_rec=(1-\alpha)\times B'+\alpha\times B'' \quad (6)$$

Here, α is the percentage of saturated pixels in the reference region referred to by the recovery filters corresponding to the third and fourth filter processing units 104 and 105 (i.e., is the saturation rate), and a takes a value from 0 to 1.

$$\alpha=Ns/Nf \quad (7)$$

Nf: total number of pixels in reference region
Ns: number of saturated pixels in reference region In the example shown in FIGS. 6A to 6D, the five-tap one-dimensional filter shown in FIG. 9C is used, and therefore in the case where the pixel of interest is X3, the saturated pixels that are referred to are X1 and X2, and the number of saturated pixels Ns is 2. Similarly, when the pixel of interest is X4, the saturated pixel that is referred to is X2, and the number of saturated pixels Ns is 1. Accordingly, the saturation rate a with respect to the total number of pixels Nf=5 in the reference region referred to by the filters is 0.4 at the pixel position X3, and is 0.2 at the pixel position X4.

Figure 6D:
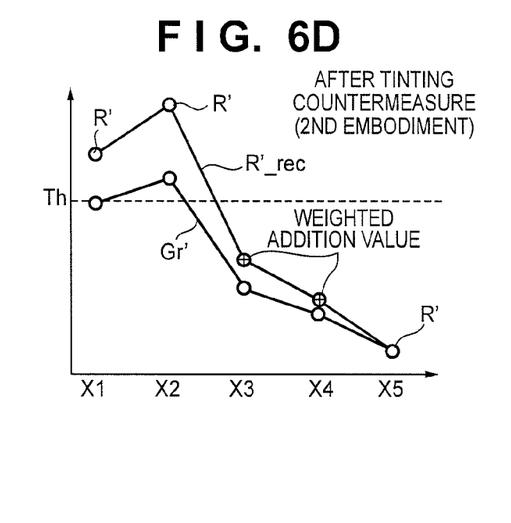

FIG. 6D shows the signal values R'_rec resulting from image recovery processing in which the R component values at the pixel positions X3 and X4 are weighted addition values reflecting R'. As shown in this figure, the step from the pixel position X4 to the pixel position X5 has been reduced in the R signal resulting from image recovery processing. At the pixel positions X2 and X3 as well, the balance between the color components is closer to the balance prior to image recovery processing than in the results of performing normal image recovery processing (FIG. 6B), and the obtained recovery effect is better than in the results of employing the method of the first embodiment (FIG. 6C).

In this way, in the present embodiment, in the case where a saturated pixel is referred to in recovery filter processing, a color difference adjustment value in which the signal value resulting from image recovery processing is reflected according to the percentage of saturated pixels in the reference region referred to by the recovery filters, is used as the color component value resulting from image recovery processing. This makes it possible to realize an effect of suppressing tinting in and around a saturated portion while also suppressing the appearance of a pseudo contour that appears in the case where color difference adjustment values are used, as is, as color component values resulting from image recovery processing. Also, the effect of the pixel image recovery processing can be improved since the color component that is not included in the color difference adjustment value and results from image recovery processing is reflected.

Other Embodiments

Note that the above embodiments describe configurations in which the R component and the B component are corrected based on the premise that among the color components that pass through the primary color filter of a current ordinary imaging element, the sensitivity to the G component is the highest, and saturation most readily occurs with the G component. In particular, the first embodiment describes a configuration in which, in the case where the recovery filters refer to a saturated pixel, image recovery processing is applied only to the luminance component (G component), and the R and B components are adjusted to values that maintain the color difference with the G component prior to image recovery processing.

However, the basic technical idea of the present invention is the correction of a portion of color components resulting from image recovery processing so as to prevent the loss of balance between the color components (difference between color component values) before and after image recovery processing. Accordingly, the present invention is not necessarily limited to correcting the R component and the B component. For example, by replacing the G component in the above description with another color component that readily becomes saturated, it is possible to apply the present invention to recovery processing performed on an image obtained by an imaging element that has different sensitivity characteristics or an imaging element having a color filter that is made up of color components other than RGB or has color components other than RGB. Also, the effects of the present invention can be obtained even if the color differences before and after recovery processing do not exactly match each other, as long as the change between before and after recovery processing is within a predetermined range.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-174967, filed on Aug. 26, 2013, which is hereby incorporated by reference herein its entirety.

What is claimed is:

1. An image processing method comprising:
    performing image recovery processing by applying a spatial filter for each value of color components of an image, the color components including a first to third color components;
    determining whether or not a saturated pixel is included in a reference region of the image, wherein the reference region is a region of pixels referred to by the spatial filter; and
    adjusting values of the first color component and the second color component resulting from the image recovery processing, according to a determination result of the determining,
    wherein in a case where it is determined in the determining that a saturated pixel is included in the reference region, the adjusting comprising:
    adjusting the value of the first color component resulting from the image recovery processing by performing weighted addition of (1) the value of the first color component and (2) a sum of a value of the third color component resulting from the image recovery processing and a difference between values of the first color component and the third color component before performing the image recovery processing, and;
    adjusting the value of the second color component resulting from the image recovery processing by performing weighted addition of (3) the value of the second color component and (4) a sum of the value of the third color component resulting from the image recovery processing and a difference between values of the second color component and the third color component before performing the image recovery processing, and the value of the third color component resulting from the image recovery processing.

2. The image processing method according to claim 1, wherein the adjusting comprises:
    calculating values of a color component that do not exist at a pixel position where the image recovery processing is applied, by interpolating values of the color component in the periphery of the pixel position; and then calculating the value of the color difference for the pixel position.

3. The image processing method according to claim 1, wherein:
    the first color component is a red (R) component, the second color component is a blue (B) component, and the third color component is a green (G) component.

4. The image processing method according to claim 1, wherein in the adjusting, when performing the weighted addition, a weight given to the value of the first color component resulting from the image recovery processing and the value of the second color component resulting from the image recovery processing become lower as the percentage of saturated pixels in the reference region increases.

5. The image processing method according to claim 1, wherein the adjusting is not performed for the first and second color components of a saturated pixel.

6. The image processing method according to claim 1, wherein it is determines that a pixel is the saturated pixel if a value of the pixel is greater than or equal to a predetermined threshold value.

7. A non-transitory computer-readable storage medium that stores a program that causes a computer to perform an image processing method comprising:
- performing image recovery processing by applying a spatial filter for each value of color components of an image, the color components including a first to third color components;
- determining whether or not a saturated pixel is included in a reference region of the image, wherein the reference region is a region of pixels referred to by the spatial filter; and
- adjusting values of the first color component and the second color component resulting from the image recovery processing, according to a determination result of the determining,
- wherein in a case where it is determined in the determining that a saturated pixel is included in the reference region, the adjusting comprising:
- adjusting the value of the first color component resulting from the image recovery processing by performing weighted addition of (1) the value of the first color component and (2) a sum of a value of the third color component resulting from the image recovery processing and a difference between values of the first color component and the third color component before performing the image recovery processing, and;
- adjusting the value of the second color component resulting from the image recovery processing by performing weighted addition of (3) the value of the second color component and (4) a sum of the value of the third color component resulting from the image recovery processing and a difference between values of the second color component and the third color component before performing the image recovery processing, and the value of the third color component resulting from the image recovery processing.

8. An image processing apparatus comprising:
- a memory storing a computer program which, when executed by a CPU of the image processing apparatus, causes the CPU to function as:
- a filter unit configured to perform image recovery processing by applying a spatial filter for each value of color components of an image, the color components including a first to third color components;
- a determination unit configured to determine whether or not a saturated pixel is included in a reference region of the image, wherein the reference region is a region of pixels referred to by the spatial filter; and
- an adjustment unit configured to adjust values of the first color component and the second color component from the image recovery processing, according to a determination result obtained by the determination unit,
- wherein the adjustment unit, in a case where it is determined by the determination unit that a saturated pixel is included in the reference region, adjusts the values of the first color component and the second color component resulting from the image recovery processing by:
- adjusting the value of the first color component resulting from the image recovery processing by performing weighted addition of (1) the value of the first color component and (2) a sum of a value of the third color component resulting from the image recovery processing and a difference between values of the first color component and the third color component before performing the image recovery processing, and;
- adjusting the value of the second color component resulting from the image recovery processing by performing weighted addition of (3) the value of the second color component and (4) a sum of the value of the third color component resulting from the image recovery processing and a difference between values of the second color component and the third color component before performing the image recovery processing, and the value of the third color component resulting from the image recovery processing.

* * * * *